United States Patent [19]

Ray et al.

[11] Patent Number: 5,057,298

[45] Date of Patent: Oct. 15, 1991

[54] PROCESS FOR RECOVERY OF SULFUR VALUES FROM A GAS STREAM

[75] Inventors: William G. Ray, Mountain Lakes, N.J.; John C. Arbo, New York, N.Y.; George E. Gryka, Southport, Conn.

[73] Assignee: Pipco, Inc., Southport, Conn.

[21] Appl. No.: 548,195

[22] Filed: Jul. 2, 1990

Related U.S. Application Data

[63] Continuation of Ser. No. 233,255, Aug. 16, 1988, abandoned.

[51] Int. Cl.$^5$ ............................................. C01B 17/05
[52] U.S. Cl. .................. 423/574 L; 423/222
[58] Field of Search ............... 423/222, 574 L, 575

[56] References Cited

U.S. PATENT DOCUMENTS

| | | | |
|---|---|---|---|
| 1,925,198 | 9/1933 | Melvill | 423/222 |
| 2,031,802 | 2/1936 | Tyrer | 423/243 |
| 2,729,543 | 1/1956 | Keller | 423/575 |
| 3,833,508 | 9/1974 | Austin et al. | 55/73 |
| 3,911,093 | 10/1975 | Sherif et al. | 423/574 R |
| 3,933,994 | 1/1976 | Rounds | 423/575 |
| 3,983,225 | 9/1976 | Van Brocklin et al. | 423/574 L |
| 4,366,134 | 12/1982 | Korosy et al. | 423/243 |
| 4,442,083 | 4/1984 | Canales et al. | 423/567 R |
| 4,450,145 | 5/1984 | Klepeis | 423/574 C |
| 4,519,994 | 5/1985 | Smalheiser | 423/242 |
| 4,634,582 | 1/1987 | Sliger et al. | 423/575 |

FOREIGN PATENT DOCUMENTS 142804  5/1985  European Pat. Off. ........ 423/574 L

OTHER PUBLICATIONS

Sulfur Removal By An Aqueous Process, M. J. Canales, Mar., 1985 pp. 1–15.
Chemistry of SO$_2$ Absorption and Conversion to Sulfur by the Citrate Process, Korosy, et al., Apr., 1974 (17 total pp.).

Primary Examiner—Jeffrey E. Russel
Attorney, Agent, or Firm—Daniel S. Ortiz

[57] ABSTRACT

The invention is a process wherein SO$_2$ is absorbed in a concentrated solution of potassium citrate and the solution is reacted with H$_2$S at a temperature above the melting point of sulfur to form elemental sulfur. The reaction produces a solution lean in sulfur dioxide. SO$_2$, in the form of a rich solution or a gas, can be introduced into the lean solution in order to inhibit post-formation of sulfur. This introduction of SO$_2$ avoids a tendency for sulfur to form continually after the solution exits the reaction zone.

12 Claims, 2 Drawing Sheets

PROCESS FOR RECOVERY OF SULFUR VALUES FROM A GAS STREAM

This is a continuation of application Ser. No. 07/233,255 filed Aug. 16, 1988, now abandoned.

FIELD OF THE INVENTION

The invention relates to recovery of sulfur from gas streams. More particularly, the invention is a regenerative process for recovery of sulfur values from gas streams containing $H_2S$ or $SO_2$ by a liquid process.

BACKGROUND OF THE INVENTION

Many processes have been described in which $SO_2$ is absorbed in a buffered salt solution and the buffered salt solution is contacted with $H_2S$ to form sulfur.

U.S. Pat. No. 2,729,543 discloses a process in which $SO_2$ is absorbed in a solution of a salt capable of buffering in the range of pH 4–6 and the solution reacted with $H_2S$ to form sulfur. A number of inorganic and organic salts are disclosed including alkali metal salts of citric acid. The patent discloses that the reaction rate between the solution and $H_2S$ is pH and temperature sensitive and is at maximum at a temperature between about 40° and 70° C. The reaction rate is independent of the $H_2S$ partial pressure but is dependent on the thiosulfate concentration. The $SO_2$ loadings and sulfur formation rates disclosed are very low.

U.S. Pat. No. 3,833,508 discloses a method for selectively absorbing $SO_2$ from a gas stream containing $H_2S$ by contacting the gas stream with a solution of an alkali metal salt of certain organic acids such as citric acid at at a pH in the range of 4 to 6. The $H_2S$ is not absorbed and does not react with the $SO_2$ absorbed in the solution.

U.S. Pat. No. 3,911,093 discloses a regenerative process in which $SO_2$ is absorbed in a buffered alkali metal orthophosphate solution. The solution containing the $SO_2$ is reacted with $H_2S$ to form sulfur and regenerate the absorbent solution which is recycled to absorb $SO_2$. The process has been used to remove small amounts of $SO_2$ from waste gases and to recover the sulfur values from "sour natural gas" which contains $H_2S$. The process requires large solution circulation rates since the orthophosphate solution has only a small capacity for absorbing $SO_2$. In addition, the process has a difficulty in that sulfur continues to be formed after the solution has been removed from contact with the $H_2S$ containing gas. An improved process is disclosed in U.S. Pat. No. 4,519,994 in which the amount of $SO_2$ absorbed by the solution is increased by increasing the concentration of alkali metal phosphate in the solution. However, the amount of $SO_2$ absorbed is still low. Other regenerative processes are disclosed in U.S. Pat. No. 3,983,225 and U.S. Pat. No. 4,442,083.

U.S. Pat. No. 2,031,802 and U.S. Pat. No. 4,366,134 disclose processes which use alkali metal phosphate and citrate salts to absorb $SO_2$ from a gas stream followed by stripping the absorbed $SO_2$ from the solution by heat or low pressure.

In the face of a need for removing $SO_2$ from gas streams and recovering the sulfur values from sour gas, refinery streams, chemical process streams, coal gasification gas streams and coal liquefaction off gases, the buffered salt solution processes have not received wide commercial use despite their inherent advantage which include compact size, ease of control and low environmental impact. The lack of widespread commercial use of the processes is due to the large circulation liquid streams and the low sulfur formation rates which translate to high investment costs, and the difficulty with post-formation of sulfur which tends to form in the circulation solution after the solution has contacted $H_2S$ and is being recirculated to the $SO_2$ absorption apparatus. The post-formation of sulfur after contact with $H_2S$ has been completed tends to clog conduits, heat exchangers and packing associated with the absorption of $SO_2$.

BRIEF SUMMARY OF THE INVENTION

According to the present invention, sulfur can be recovered by a process which comprises contacting a gas containing $SO_2$ with about a 1.0 to about 3.5 molar solution of potassium citrate at a pH of from about 4 to about 7.0 to form a rich solution containing from about 40 to 170 grams per liter of absorbed $SO_2$; contacting the rich solution with a gas containing $H_2S$ at a temperature above the melting point of sulfur to form liquid sulfur and a lean solution, and recovering the sulfur from the lean solution. The liquid sulfur is separated from the lean solution avoiding the complex techniques required to separate and handle solid sulfur.

The invention also includes a method which can be utilized to prevent post-formation of sulfur after the lean solution has been removed from contact with the gas containing $H_2S$. The method comprises adding $SO_2$ to the lean solution, preferably adding a portion of the rich solution to the lean solution after the sulfur has been separated from the lean solution. The method can be used to prevent post-formation of sulfur in any process which utilizes a buffered salt solution to absorb $H_2S$ and regenerate the solution by contact with $H_2S$ to form sulfur.

DETAILED DESCRIPTION OF THE INVENTION

Figure 1:
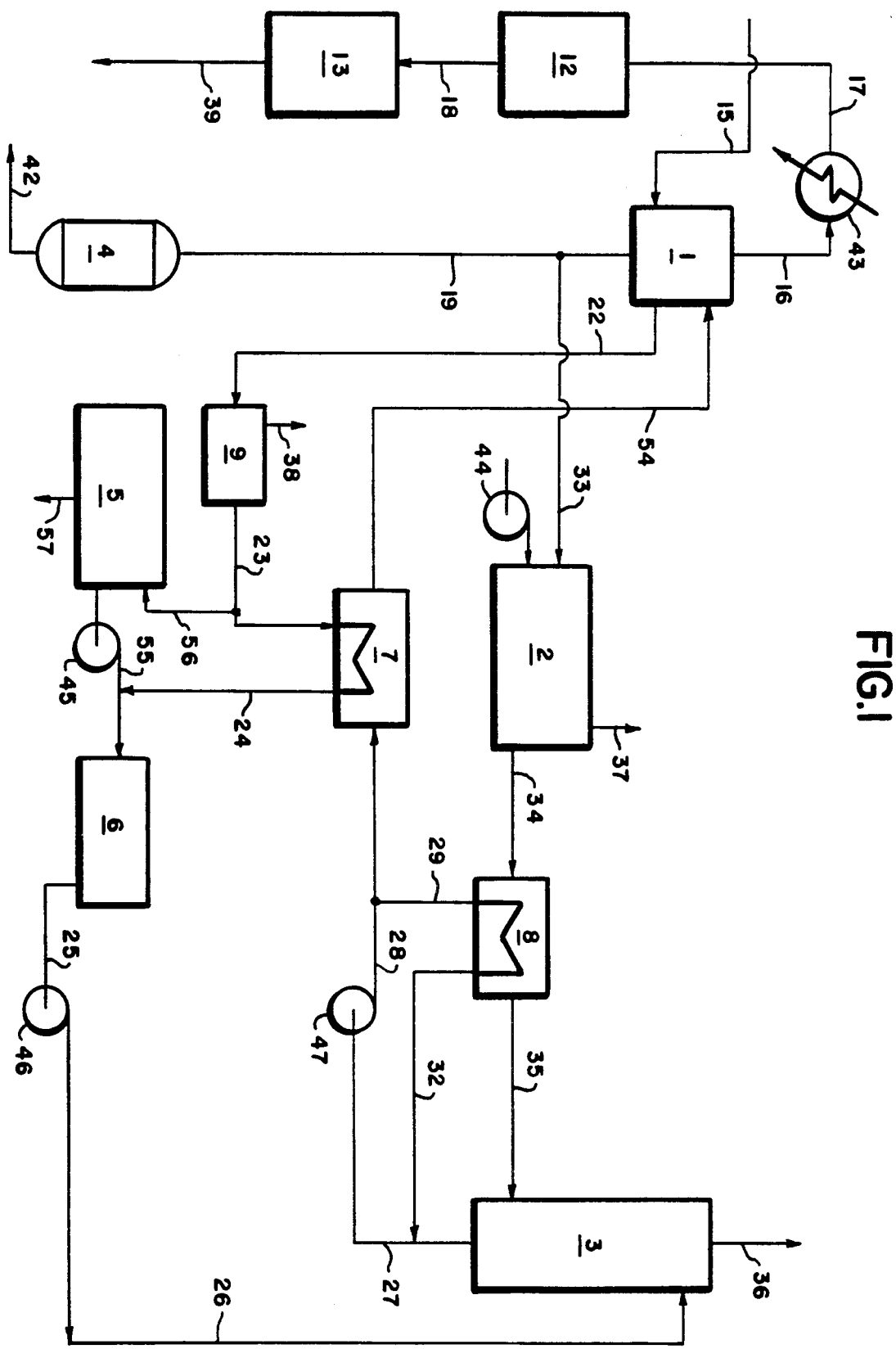
FIG. 1 is a schematic of a preferred embodiment of the invention.

The present invention is a process for recovering sulfur values from a gas stream. The process is particularly useful for recovering the sulfur values in $H_2S$ from sour natural gas or from refinery streams. The process is also useful for recovering the sulfur values in $SO_2$ from gas streams when a source of $H_2S$ is readily available.

The process is particularly useful since $SO_2$ is absorbed in an absorbant which is capable of carrying a high loading of $SO_2$ and the absorbed $SO_2$ is rapidly reacted with $H_2S$ in a reaction zone to form sulfur. The strong affinity of the solution for absorbing $SO_2$ permits the use of a smaller absorption zone. The small volume of the solution containing $SO_2$ substantially reduces the size of the liquid handling equipment including heat exchangers, storage tanks, pumps, filters and the reaction zone required to react with the hydrogen sulfide. The high rate of sulfur formation reduces liquid retention time and, therefore, the size of the zone needed to contact $H_2S$ with the rich solution and to separate the sulfur formed in the process from the circulating buffered salt solution.

A second improved process of the invention is a method for preventing the post-formation of sulfur in a regenerative system wherein an $SO_2$ containing solution is reacted with $H_2S$ to form sulfur. The post-formation of sulfur occurs after the lean solution has been removed from contact with the $H_2S$ containing gas. The addition of a small amount of $SO_2$ to the lean solution substantially reduces the post-formation of sulfur and reduces the problems associated with plugging of equipment due to the formation of sulfur.

The addition of small amounts of $SO_2$ to the lean absorption solution can be utilized with any regenerative process wherein a solution containing $SO_2$ is absorbed in a buffered salt solution and the $SO_2$, in the solution, reacted with $H_2S$ to form sulfur. The addition of $SO_2$ to the lean solution can preferably be accomplished by introducing a portion of the rich solution into the lean solution.

The process will be described in relation to the process as set forth in FIG. 1 which is a flow sheet for a process directed to the recovery of the sulfur values from $H_2S$ contained in a sour gas stream. However, the process is useful for removing $SO_2$ from gas streams as long as means are provided for supplying $H_2S$ to the process.

About one-third of the sulfur produced in the process leaving the reactor separation zone 1 passes through Line 33 to furnace waste heat boiler zone 2 wherein the sulfur is burned with an oxygen containing gas introduced into the furnace waste heat boiler zone 2 through blower 44. The furnace operates in conjunction with a waste heat boiler and steam is generated which leaves the waste heat boiler through line 37. The gas stream containing $SO_2$ passes from the furnace waste heat boiler zone 2 through line 34 through cooler 8 and line 35 to $SO_2$ absorption, zone 3. Cooler 8 can be a quench zone or an indirect cooling zone which interchanges heat with the sulfur dioxide rich absorbant which leaves $SO_2$ absorption zone 3 through line 27, pump 47 and line 28. The gas leaves the cooler 8 at a temperature of about 50° C., preferably saturated with water vapor.

Figure 2:
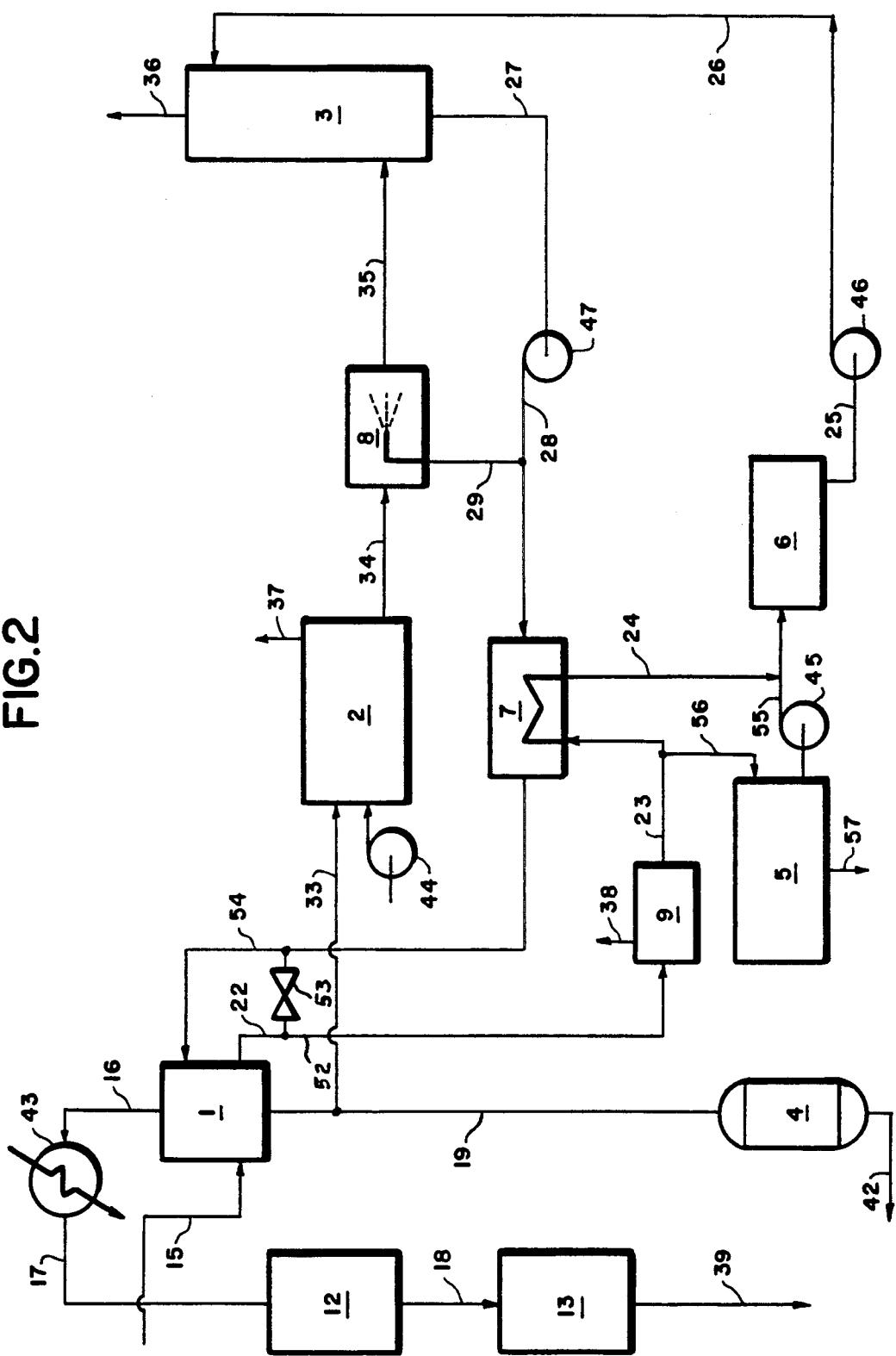
FIG. 2 is a schematic of a second preferred embodiment of the invention.

The stream of $SO_2$ rich absorbant for cooling the $SO_2$ containing gas stream from furnace waste heat boiler zone 2 enters the cooler through line 29 and is recirculated back to the suction of pump 47 through line 32. Water for quenching can be the condensate from cooler condenser 43 which can be used to cool the $SO_2$ gas by direct injection into the gas stream. FIG. 2 illustrates quenching of the $SO_2$ with $SO_2$ rich solution. The temperature of $SO_2$ containing gas from the furnace waste heat boiler zone 2 is controlled to control the temperature at which absorption occurs, preferably at about 50° C. or below.

The absorption should take place at the lowest possible temperature, preferably at or below about 50° C., so that the $SO_2$ rich absorption solution is loaded with $SO_2$ at the preferred concentration of at least 120 g/liter. Higher temperatures reduce the $SO_2$ loading of the solution leaving the $SO_2$ absorber zone 3 and increase $SO_2$ in the vent gas line 36.

The circulating absorption solution is a solution of potassium citrate. The solution is at a pH in the range of about 4.0 to about 7.0, preferably 4.5 to about 6.5. The concentration of potassium citrate in the solution is preferably as high as possible but below the concentration at which the potassium citrate would crystallize from the solution at the coldest or most concentrated part of the process. Generally, a concentration in the range of about 1.0 to about 3.5 molar is suitable and about 2 molar is preferred. The absorption zone operates at a temperature of about 50° C. and provides a rich solution containing from about 40 to about 160 grams per liter of absorbed $SO_2$. Preferably the rich solution contains from about 70 to 140 grams per liter of absorbed $SO_2$. The lean solution enters the absorption zone at a pH in the range of about 5.2 to about 7.0 and preferably between about 5.8 and about 6.5. Generally the vent gases leave the absorption zone with less than about 250 parts per million by volume of $SO_2$ which is the current standard for best available control technology. The concentration of $SO_2$ in the vent gas stream can be reduced to 75 parts per million by volume or less, depending upon the number of theoretical plates in the column, the circulation rate of the solution, the temperature, pressure and concentration of $SO_2$ in the absorption solution entering the absorption zone.

The absorption solution rich in $SO_2$ leaves the absorption zone through line 27, pump 47 and line 28. A portion of the $SO_2$ rich absorption solution is passed through cooler 8 and cools the gas entering the absorption zone. The cooler can be an indirect exchanger or a quench zone. The $SO_2$ rich absorbent stream then passes through heat exchanger 7 in which the $SO_2$ rich solution is heated and the lean absorption solution is cooled and passed to lean potassium citrate storage tank 6 through line 24. It may be necessary to supply additional heat to the solution depending on its $SO_2$ content and the $H_2S$ content in the gas stream 15 entering the reactor separation zone.

The heated rich solution passes through line 54 to reaction and separation zone 1. In the reaction and separation zone 1, the $SO_2$ rich absorbent is contacted with a gas stream containing $H_2S$. The $H_2S$, at about 120° C., enters the reaction separation zone through line 15. The $H_2S$ in the gas stream reacts with the absorbed $SO_2$ to form sulfur. The reactions are very complex, but the overall reaction can be set forth as $2H_2S+SO_2\rightarrow 3S+2H_2O$. Although the overall reaction can be stated rather simply, it is understood that the reaction is very complex and can proceed through reactions of several intermediate compounds.

The reaction between the $H_2S$ containing gas and the potassium citrate solution containing absorbed $SO_2$ is carried out at an elevated pressure and a temperature above the melting point of sulfur and below the temperature where sulfur becomes a very viscous material (in the range of 150° to 160° C.). The preferred reaction temperature is about 125° C.

It is preferred that the reaction temperature be maintained as low as possible so that any thermal decomposition of the citrate moiety can be minimized. The reaction is carried out at an elevated pressure which can be any pressure at or above the boiling point of the potassium citrate solution at the reaction temperature. Higher pressures provide higher partial pressures of $H_2S$ and a longer contact time between the gas containing $H_2S$ and the absorbant solution. The absorbant solution is generally contacted with an amount of $H_2S$ which is sufficient to react with the $SO_2$ absorbed in the absorbant to form sulfur. However, a deficiency or an excess of $H_2S$ can be utilized over a short term but a stoichiometric amount is eventually required if the process is to be operated in a regenerative manner over a substantial period of time.

The process toleration for fluctuations in $H_2S$ is due to the presence of thiosulfate in solution which serves to temporarily accommodate stoichiometric imbalances. Although the concentration of thiosulfate in the circulating solution outside the reactor can range from about 0.1 molar to saturation, the preferred range is 0.5 to 1.0 molar.

The reaction between $H_2S$ and the $SO_2$ absorbed in the potassium citrate solution is an exothermic one. Since the concentration of $SO_2$ absorbed in the potassium citrate solution is very high, the temperature of the reacting solution in the reaction zone must be controlled or the temperature increases to the point that the sulfur becomes viscous and degradation of the citrate moiety occurs.

Various methods for extracting heat can be provided. Various arrangements for contacting the $H_2S$ containing gas with the potassium citrate absorbant solution containing absorbed $SO_2$ can be provided. The intensity of the vapor liquid mixing, the time of vapor liquid contact, and liquid residence time within the vapor liquid contact zone are important.

The formation of sulfur by reaction of the $SO_2$ absorbed in the potassium citrate solution and the $H_2S$ in the gas stream is very rapid throughout the range of pH 4.4 to 6.4. It is unexpected that the sulfur formation rate is high since the rate of sulfur formation in buffered salt solution absorbants disclosed in the prior art is relatively low. The rapid formation of sulfur coupled with the high concentration of absorbed $SO_2$ and the small recycle stream provides a process which can be built and operated at a cost substantially less than for the known buffered salt absorbant sulfur recovery processes.

Due to the reaction between the $H_2S$ and the absorbed $SO_2$, the amount of $H_2S$ in the $H_2S$ gas stream is substantially reduced in the reaction zone. The gas stream leaves the reaction separation zone through line 16 and is cooled in a cooler 43 and passes through line 17 to a $H_2S$ removal zone 12. The cooler 43 can interchange heat with the feed gas (15), thus warming the feed gas if necessary. Condensate from the cooler can be used to quench furnace off gases 34. At least ⅔ of the $H_2S$ in the gas stream has been removed at this point by passage through the reaction separator zone. The $H_2S/CO_2/N_2$ removal system can be substantially reduced in size to provide a gas which meets the pipeline standards in Zone 12. The standard amine absorbant scrubbing systems, cryogenic, and/or membrane systems can be utilized to reduce the $H_2S$ in the gas from the reaction separation zone to meet the pipeline specification. The separated $H_2S$, if any, can be burned in the furnace in combination with other impurities such as $CO_2$ and $N_2$. The amount of sulfur supplied to the furnace must be reduced to maintain stoichiometric balance. It is obvious, in cases where the feed 15 is a waste gas requiring treatment, off gases from the reactor cooler in line 17 can be burned in the furnace as is.

The gas stream substantially free from $H_2S$ is then passed through conduit 18 and dried in drying zone 13 and passes out of the process through line 39 to its intended use. The drying system can comprise the known drying systems including the regenerative glycol drying process or solid absorbant systems. Methods for drying natural gas streams are well known in the art.

After contact with the $H_2S$ containing gas stream, the potassium citrate solution carrying the molten sulfur formed by the reaction between the $H_2S$ and the $SO_2$ in the absorbant is passed to a settling zone wherein the sulfur droplets are permitted to separate from the aqueous phase. The liquid sulfur passes from the reaction separation zone through line 19 to sulfur storage tank 4.

When needed, the sulfur can be removed from the storage through line 42. About one-third, reduced by any $H_2S$ diverted to the furnace and/or any $SO_2$ available from other sources, of the sulfur formed in the reaction separation zone 1 passes through line 33 as the source of sulfur for furnace waste heat boiler zone 2.

The aqueous solution of potassium citrate passes out of the reaction separation zone through line 22 to flash tank 9. Any small amount of sulfur still in suspension can easily be removed by passing the solution through a coaleser or filters prior to cooling the solution by flashing.

In flash tank 9, the pressure of the solution is reduced and water vapor and dissolved gases are separated from the solution and flow through vent line 38. The solution at a lower pressure passes through line 23 to cooler 7 where the solution is cooled by interchange with the cool solution flowing from the absorption zone 3 to the separation reaction zone 1. The cooled potassium citrate solution passes from cooler 7 through line 24 to line 55 and into lean potassium citrate storage tank 6.

A side stream of the lean potassium citrate solution passes through line 56 to potassium sulfate removal zone 5. In potassium sulfate removal zone 5, the solution is cooled to about 25° C. Potassium sulfate, which builds up in the circulating potassium citrate solution, crystalizes and is removed from the system. Potassium sulfate is removed from the potassium sulfate removal zone through line 57. Potassium sulfate can be utilized as a fertilizer material.

Potassium sulfate removal zone 5 can be any of the known means for crystalizing and separating material of limited solubility from a liquid stream. Preferably, the potassium sulfate removal zone is a vacuum crystalizer. A vacuum crystalizer is particularly preferred because the temperature of the solution is lowered by evaporation of water. The evaporation of water in the vacuum crystalizer in combination with water contained in the vent from the flash tank 38, exhaust from the $SO_2$ absorber 36, and condensate from the reactor off gas cooler 43 (if discarded) can be utilized to control the water balance in the process.

The potassium sulfate is formed when the potassium citrate solution contacts the $SO_2$ from the furnace waste heat boiler zone 2. When sulfur is burned to form $SO_2$, a small amount of the sulfur is converted to sulfur trioxide. The sulfur trioxide forms the sulfate ion when dissolved in water. Also, a small amount of sulfate may be formed by a thiosulfate side reaction while the solution is at an elevated temperature. The potassium lost through the potassium sulfate removal zone must be replenished by the addition of potassium hydroxide or potassium carbonate to the circulating potassium citrate solution. Additional citric acid must also be added to the system to replenish the citrate ion which can be degraded at the temperatures of the reaction separation zone or included in the liquid which leaves the system with the potassium sulfate. The potassium sulfate can be utilized as a fertilizer material.

The solution from which the potassium sulfate has been removed is passed through pump 45 and line 55 to the potassium citrate lean storage tank 6. The lean potassium citrate solution passes through line 25, pump 46 and line 26 to the $SO_2$ absorption zone where it is contacted by an $SO_2$ containing gas.

The process as described in relation to FIG. 1 is directed to a process for recovering the sulfur values from a gas stream containing $H_2S$. As discussed in the specification, the gas stream can be natural gas. However, the gas stream can also be a refinery stream chemical process stream, coal gasification product, or coal liquification off gas, which contains $H_2S$.

The process is not limited to recovering the sulfur values from a gas stream containing $H_2S$. The process can be utilized to recover the sulfur values from a gas stream containing $SO_2$. In that case, the furnace waste heat boiler and its associated equipment are not required since the gas stream to be treated contains $SO_2$. However, the process for recovering the sulfur values in a gas stream containing $SO_2$ is particularly useful when there is also a readily available gas stream containing $H_2S$.

If the reaction zone 1 is large, $H_2S$ removal approaches completion and Zone 12 may not be needed. If it is not necessary to meet pipeline specifications for $H_2S$ and water, the $H_2S$ removal zone 12 and/or the drying zone 13 can be eliminated from the process. Also, some process configuration may not require zone 9 which vents water vapor and helps control the water balance in the system.

FIG. 2 is a second embodiment of the process of the present invention. The process illustrated in FIG. 2 has means for introducing $SO_2$ into the lean potassium citrate solution which has contacted the $H_2S$ containing gas stream. Under certain conditions, which are not completely recognized, in processes in which a buffered salt solution containing $SO_2$ is reacted with $H_2S$, sulfur tends to continually form after the solution has been removed from contact with the $H_2S$ gas stream. Applicants have discovered that if some $SO_2$ is added to the lean potassium citrate solution, the post-formation of sulfur can be inhibited. The sulfur dioxide can be introduced into the lean solution in the form of a gas or liquid. However, it is preferred that a portion of the rich $SO_2$ containing absorbant stream is passed to the lean potassium citrate solution. As shown in FIG. 2 the lean solution passes through a lean solution storage zone 6 before passing to sulfur dioxide absorption zone 3. As shown, the sulfur dioxide is introduced into the lean solution at a point after the lean solution has been removed from the reaction zone and before the lean solution is passed from lean solution storage zone 6 to absorption zone 3.

As shown in FIG. 2, a portion of the rich potassium citrate solution is passed through line 52 and valve 53 to line 22. About 0.01 to 50 grams of $SO_2$ per liter are introduced into the lean potassium citrate solution. It is preferred that from about 0.1 to about 10.0 grams per liter are added to the lean potassium citrate solution. The addition of the $SO_2$ to the lean potassium citrate stream inhibits the post-formation of sulfur. The process is also useful for preventing post-formation of sulfur in any process which utilizes a buffered salt solution as an absorbant for $SO_2$ and contacts the salt solution with $H_2S$ to form sulfur and regenerate the solution.

The rate of formation of sulfur per unit volume of solution obtained by the process of the present invention is more rapid than disclosed in any of the prior art references of which applicants are aware.

EXAMPLE 1

The example illustrates the rate of formation of sulfur by reaction of $H_2S$ and a potassium citrate solution containing absorbed $SO_2$.

The experiment was conducted in an apparatus which consisted of a steam-jacketed reactor (sealed stainless steel cylinder equipped with baffles and a magnetically driven stirrer), a scale mounted $H_2S$ feed system, and a blow-down container of ice. The apparatus was instrumented and interconnected to (a) permit continuous monitoring of the weight to $H_2S$ fed to the reactor, (b) control pressure within the reactor at 70 psig by maintaining a constant $H_2S$ pressure, (c) control temperature of the incoming $H_2S$, (d) measure the temperature of the reaction mass, and (e) permit rapid discharge of reactor products into the blow-down container.

An initial solution was prepared containing a 2 molar concentration of potassium citrate, 1.125 moles/liter of $SO_2$ and a pH of 5.6. The air in the reactor was evacuated and the reactor was filled one-half full of the initial solution. The solution was heated to 124.4° C. ($\pm 3.3°$ C.). The agitator was turned on and set to rotate at 500 rpm. The $H_2S$ feed was turned on for a predetermined amount of time and then shut off. The material in the reactor was blown-down into the container of ice within 20 seconds after the $H_2S$ feed was discontinued. The cool products were quantitatively analyzed and a material balanced calculated. At the end of the first $3\frac{1}{2}$ minutes period, 0.85 moles per liter of $H_2S$ had reacted. The concentration of thiosulfate was 0.64 moles per liter.

TABLE 1

| ELAPSED TIME minutes | FINAL pH | FINAL CONC. $S_2O_3$ moles/l | SULFUR PRODUCED moles/l | S FORMATION RATE moles S/l/min |
|---|---|---|---|---|
| 3.5 | 5.2 | .64 | .66 | |
| 6 | 5.3 | .47 | 1.25 | .24 |
| 8 | 5.5 | .42 | 1.67 | .22 |
| 12 | 5.6 | .30 | 1.95 | .15 |
| 52 | 6.2 | .09 | 3.04 | .06 |

The example illustrates the rapid formation of sulfur by reaction between the $H_2S$ and the absorbant solution containing $SO_2$. Within 6 minutes, approximately ⅔ of the sulfur had been formed.

EXAMPLE 2

The apparatus used in this example was the same as used in Example 1.

An initial solution containing a two molar concentration of potassium citrate and 1.7 moles per liter of $SO_2$ was prepared. The pH of the solution was 5($\pm 0.04$). The air in the system was evacuated and the reactor was filled half full of the initial solution. The solution was heated to 123.8° C. ($\pm 3°$ C.) The agitator was turned on and adjusted to 500 rpm. The $H_2S$ feed was turned on for a predetermined amount of time. The material in the reactor was blown down into the container of ice within 20 seconds after the $H_2S$ was turned off. The cooled products were analyzed and the material balanced calculated. The results of the experiment appear in Table 2.

TABLE 2

| ELAPSED TIME minutes | FINAL pH | FINAL CONC. $S_2O_3$ moles/l | SULFUR PRODUCED moles/l | S FORMATION RATE moles S/l/min |
|---|---|---|---|---|
| 3.5 | 4.5 | .78 | .77 | |
| 5.0 | 4.7 | .73 | 1.34 | .38 |
| 6.0 | 4.9 | .68 | 1.88 | .44 |

The table shows that the sulfur formation rates are faster at higher concentrations of $S_2O_3$ and lower pH.

The above examples clearly illustrate the rapid formation of sulfur by reaction between the $H_2S$ and the $SO_2$ rich potassium citrate solution. The rate of formation of sulfur per liter of solution per minute is substantially higher than any rate disclosed in the prior art.

The process is not limited to the embodiments disclosed herein but is fully commensurate with the claims.

I claim:

1. A method for recovering sulfur which comprises: contacting a gas containing $SO_2$ in a gas contacting zone with a lean solution containing about a 1.0 to about 3.5 molar solution of potassium citrate at a pH from about 4.5–7.0 to form a rich solution containing from about 40 to about 160 grams per liter of $SO_2$; containing the rich solution with a gas containing $H_2S$ in a reaction zone at a temperature above the melting point of sulfur to form liquid sulfur and a lean solution; removing the lean solution from the reaction zone; recovering the sulfur from the lean solution after the solution has contacted the $H_2S$; and passing the lean solution to the gas contacting zone to contract $SO_2$.

2. A method of claim 1 further comprising: introducing $SO_2$ into the lean solution, after the lean solution has been removed from the reaction zone, and cooling the lean solution after the introduction of the $SO_2$ before the lean solution is introduced into the gas contacting zone, whereby post-formation of sulfur is inhibited.

3. A method of claim 2 wherein from about 0.01 to about 50 grams/liter of $SO_2$ is introduced into the lean solution.

4. A method of claim 3 wherein the $SO_2$ is introduced into the lean solution by adding a portion of rich solution to the lean solution.

5. The process of claim 1 wherein the pH is from about 4.5 to about 6.5.

6. A process of claim 2 wherein the rich solution contains from about 70 to about 140 grams/liter of absorbed $SO_2$.

7. A process of claim 2 wherein the $SO_2$ is introduced into the lean solution after the sulfur has been separated from the lean solution.

8. In a method for recovering sulfur which comprises: contacting a gas stream, from which $SO_2$ is to be removed, in an $SO_2$ absorption zone with a lean buffered salt solution at a pH of from about 4.5 to 6.5 to form a rich solution containing $SO_2$; contacting the rich solution with a gas containing $H_2S$ in a reaction zone to form sulfur and a lean solution; removing the lean solution from the reaction zone; separating sulfur from the lean solution; passing the lean solution to a lean solution storage zone and passing the lean solution from the lean solution storage zone to the $SO_2$ absorption zone; the improvement which comprises introducing $SO_2$ into the lean solution after the lean solution has been removed from the reaction zone and before the lean solution has been removed from the lean solution storage zone and introduced into the $SO_2$ absorption zone, whereby post-formation of sulfur is inhibited.

9. A process of claim 7 wherein the $H_2S$ contacts the rich solution containing $SO_2$ at a temperature above the melting point of sulfur.

10. A process of claim 8 wherein $SO_2$ is introduced into the lean solution after the sulfur has been separated from the lean solution.

11. A process of claim 8 wherein from about 0.01 to about 50 grams per liter of $SO_2$ is introduced into the lean solution.

12. A process of claim 11 wherein the $SO_2$ is introduced into the lean solution by adding a portion of the rich solution to the lean solution.

* * * * *